United States Patent
Schütz et al.

(10) Patent No.: US 11,089,056 B2
(45) Date of Patent: Aug. 10, 2021

(54) INTRUSION DETECTION WITH HONEYPOT KEYS

(71) Applicant: Sophos Limited, Abingdon (GB)

(72) Inventors: Harald Schütz, Linz (AT); Andreas Berger, Linz (AT); Russell Humphries, Horley (GB); Mark D. Harris, Oxon (GB); Kenneth D. Ray, Seattle, WA (US)

(73) Assignee: Sophos Limited, Abingdon (GB)

( * ) Notice: Subject to any disclaimer, the term of this patent is extended or adjusted under 35 U.S.C. 154(b) by 254 days.

(21) Appl. No.: 16/146,261

(22) Filed: Sep. 28, 2018

(65) Prior Publication Data
US 2020/0106808 A1 Apr. 2, 2020

(51) Int. Cl.
| | |
|---|---|
| *H04L 29/06* | (2006.01) |
| *G06F 21/55* | (2013.01) |
| *G06F 21/62* | (2013.01) |
| *G06F 21/53* | (2013.01) |
| *G06F 21/56* | (2013.01) |

(52) U.S. Cl.
CPC ......... *H04L 63/1491* (2013.01); *G06F 21/53* (2013.01); *G06F 21/554* (2013.01); *G06F 21/566* (2013.01); *G06F 21/62* (2013.01); *H04L 63/0263* (2013.01); *H04L 63/0428* (2013.01); *H04L 63/06* (2013.01); *H04L 63/101* (2013.01); *H04L 63/145* (2013.01); *H04L 63/1416* (2013.01)

(58) Field of Classification Search
CPC . H04L 63/0428; H04L 63/1416; H04L 63/06; H04L 63/0263; H04L 63/101; H04L 63/145; H04L 63/1491; G06F 21/53; G06F 21/62; G06F 21/554; G06F 21/566
See application file for complete search history.

(56) References Cited

U.S. PATENT DOCUMENTS

| | | | | |
|---|---|---|---|---|
| 7,660,797 B2 * | 2/2010 | Marinescu | ............... | G06F 21/56 726/22 |
| 8,191,140 B2 * | 5/2012 | Cohen | .................. | G06Q 20/341 726/23 |
| 9,043,905 B1 * | 5/2015 | Allen | .................... | G06F 21/552 726/22 |

(Continued)

FOREIGN PATENT DOCUMENTS

| | | |
|---|---|---|
| WO | WO-2020068959 | 4/2020 |

OTHER PUBLICATIONS

S. Ravji and M. Ali, "Integrated Intrusion Detection and Prevention System with Honeypot in Cloud Computing," 2018 International Conference on Computing, Electronics & Communications Engineering (iCCECE), Southend, UK, 2018, pp. 95-100. (Year: 2018).*

(Continued)

*Primary Examiner* — Kari L Schmidt
(74) *Attorney, Agent, or Firm* — Strategic Patents, P.C.

(57) ABSTRACT

A honeypot file is cryptographically secured with a cryptographic key. The key, or related key material, is then placed on a central keystore and the file is placed on a data store within the enterprise network. Unauthorized access to the honeypot file can then be detecting by monitoring use of the associated key material, which usefully facilitates detection of file access at any time when, and from any location where, cryptographic access to the file is initiated.

19 Claims, 5 Drawing Sheets

(56) References Cited

U.S. PATENT DOCUMENTS

| | | | | |
|---|---|---|---|---|
| 9,336,386 | B1* | 5/2016 | Qu | G06F 21/56 |
| 10,007,795 | B1* | 6/2018 | Chung | G06F 21/62 |
| 10,110,629 | B1* | 10/2018 | Kruse | H04L 63/0236 |
| 10,469,525 | B2* | 11/2019 | Hittel | H04L 63/145 |
| 10,503,904 | B1* | 12/2019 | Singh | G06F 21/561 |
| 10,521,584 | B1* | 12/2019 | Sharifi Mehr | H04L 63/1425 |
| 10,554,688 | B1* | 2/2020 | Wueest | H04L 63/1416 |
| 10,574,697 | B1* | 2/2020 | McClintock | H04L 63/1491 |
| 10,742,665 | B2* | 8/2020 | Gu | G06F 3/065 |
| 10,789,361 | B2* | 9/2020 | Breiman | G06F 21/565 |
| 2006/0112418 | A1* | 5/2006 | Bantz | H04L 63/102 726/4 |
| 2009/0327723 | A1* | 12/2009 | Yates | G06Q 30/08 713/168 |
| 2011/0246531 | A1* | 10/2011 | Schlemmer | G06F 16/322 707/797 |
| 2012/0030242 | A1* | 2/2012 | Nakamura | G06F 21/6218 707/781 |
| 2012/0084866 | A1 | 4/2012 | Stolfo | |
| 2013/0269032 | A1* | 10/2013 | Chasko | H04L 63/1491 726/23 |
| 2014/0040147 | A1* | 2/2014 | Varadarajan | G06Q 20/3823 705/71 |
| 2016/0012243 | A1* | 1/2016 | Fielder | G06F 21/6209 713/165 |
| 2016/0277374 | A1* | 9/2016 | Reid | H04L 63/101 |
| 2016/0301712 | A1 | 10/2016 | Shulman et al. | |
| 2016/0323316 | A1* | 11/2016 | Kolton | H04L 63/1491 |
| 2017/0324755 | A1* | 11/2017 | Dekel | G06F 21/60 |
| 2018/0018458 | A1* | 1/2018 | Schmugar | G06F 21/554 |
| 2018/0048665 | A1* | 2/2018 | Shulman | H04L 63/1425 |
| 2018/0114020 | A1* | 4/2018 | Hirschberg | G06F 21/566 |
| 2018/0189490 | A1* | 7/2018 | Maciejak | G06F 21/566 |
| 2018/0248896 | A1* | 8/2018 | Challita | G06F 21/6218 |
| 2019/0073475 | A1* | 3/2019 | Gupta | G06F 16/1734 |
| 2019/0238570 | A1* | 8/2019 | Mehner | G06F 9/442 |
| 2019/0266327 | A1* | 8/2019 | Satpathy | G06F 21/566 |
| 2019/0306168 | A1* | 10/2019 | Raman | H04L 63/1466 |
| 2019/0306179 | A1* | 10/2019 | Chelarescu | H04L 63/14 |
| 2019/0332769 | A1* | 10/2019 | Fralick | H04L 63/145 |
| 2019/0349369 | A1* | 11/2019 | Bengtson | H04L 63/0281 |
| 2019/0356661 | A1* | 11/2019 | Hecht | H04L 9/0891 |
| 2020/0082074 | A1* | 3/2020 | McGregor | G06F 21/56 |
| 2020/0089876 | A1* | 3/2020 | Aharoni | G06F 21/566 |
| 2020/0244672 | A1* | 7/2020 | Grill | H04L 63/145 |
| 2021/0097181 | A1* | 4/2021 | Reid | G06F 21/568 |

OTHER PUBLICATIONS

Monge, Marco Antonio Sotelo, Jorge Maestre Vidal, and Luis Javier García Villalba. "A novel self-organizing network solution towards crypto-ransomware mitigation." Proceedings of the 13th International Conference on Availability, Reliability and Security. 2018, pp. 1-10. (Year: 2018).*

Olagunju, Amos O., and Farouk Samu. "In search of effective honeypot and honeynet systems for real-time intrusion detection and prevention." Proceedings of the 5th Annual Conference on Research in Information Technology. 2016, pp. 41-46. (Year: 2016).*

S. Aditham and N. Ranganathan, "A System Architecture for the Detection of Insider Attacks in Big Data Systems," in IEEE Transactions on Dependable and Secure Computing, vol. 15, No. 6, pp. 974-987, Nov. 1-Dec. 2018. (Year: 2018).*

ISA, "PCT Application No. PCT/US19/52925 International Search Report and Written Opinion dated Nov. 15, 2019", 14 pages.

WIPO, "Application No. PCT/US19/52925 International Preliminary Report on Patentability dated Apr. 8, 2021", 10 pages.

* cited by examiner

INTRUSION DETECTION WITH HONEYPOT KEYS

BACKGROUND

Enterprise networks can contain valuable information that forms an increasingly attractive target for malicious actors. There remains a need for improved techniques to detect unauthorized access to files and other computing objects on an enterprise network.

SUMMARY

A honeypot file is cryptographically secured with a cryptographic key. The key, or related key material, is then placed on a central keystore and the file is placed on a data store within the enterprise network. Unauthorized access to the honeypot file can then be detecting by monitoring use of the associated key material, which usefully facilitates detection of file access at any time when, and from any location where, cryptographic access to the file is initiated.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
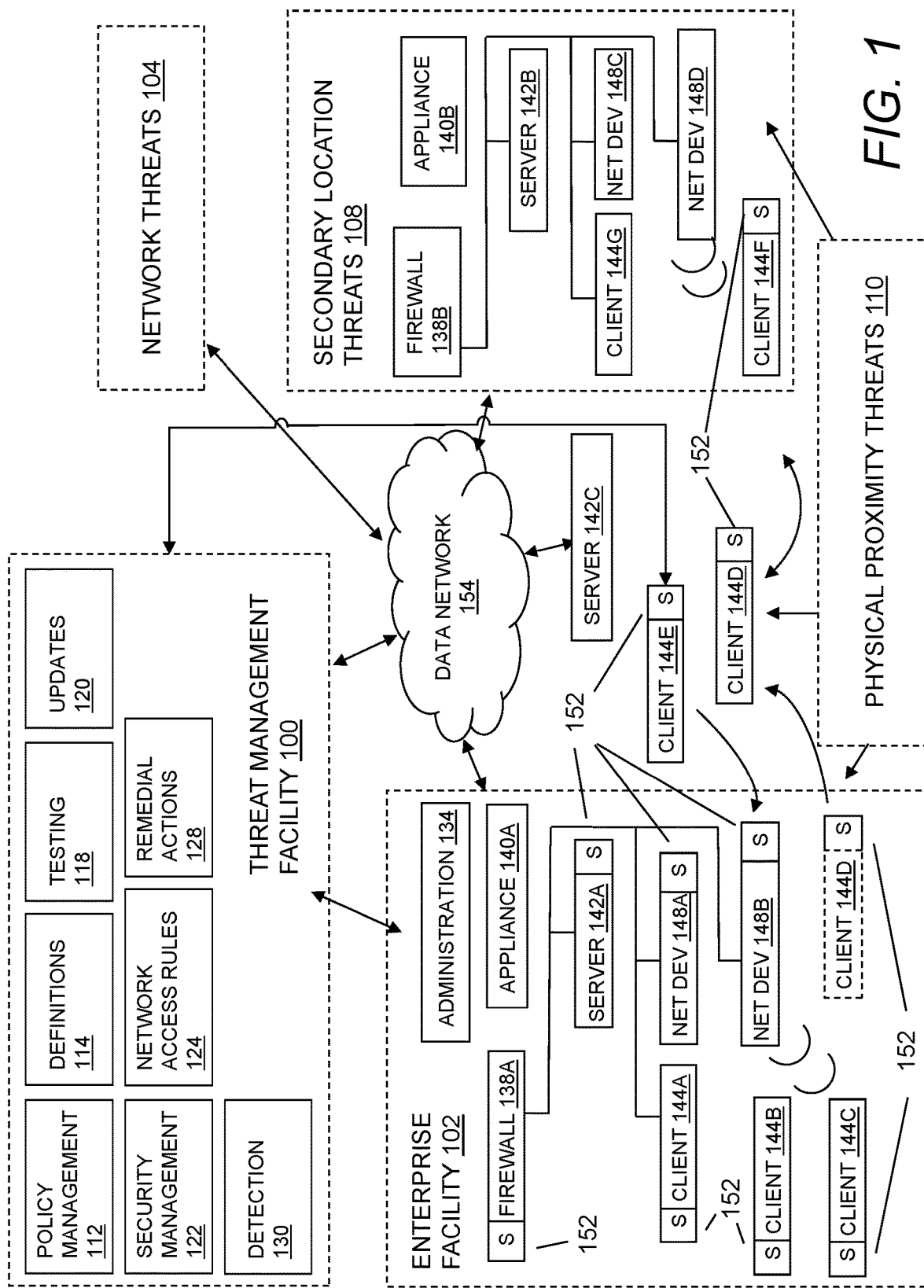
FIG. 1 illustrates an environment for threat management.

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein. Furthermore, each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

The phrase, "heterogeneous network," and similar terms or phrases as used herein, is intended to refer to networks containing or using various combinations of network devices, endpoints types, protocols, communications mediums, communications fabric, and so forth. For example, a heterogeneous network may include networks that connect devices that use different operating systems and/or protocols. A heterogeneous network may also or instead include different types of endpoints including virtual machines, mobile devices, desktop computers, servers, smart phones, and Internet-of-Things (IoT) devices such as smart appliances, smart speakers, cameras, physical security systems, physiological monitoring devices, and so forth. This can pose particular difficulties where, for example, different devices have different processing capabilities, network access interfaces and so forth. For example, certain devices may be configured for access through a web server that permits user access and configuration through a web-based interface but does not provide for programmatic access and control. Other devices may be configured for connection through short range RF interfaces and low-level device drivers running on a desktop or other network-connected device. Still other machines may be configured to connect to a wireless network through Wireless Protected Setup or any other proprietary or standardized protocol. Heterogeneous networks may also or instead include networks with different physical or logical configurations including, e.g., arrangements of access points, routers, switches, network address translation devices, gateways, firewalls, and so forth. Heterogeneous networks may also or instead include any number or configuration of remote devices accessing an enterprise network, e.g., through a virtual private network, cellular data connection, network server, cloud-based service, or the like. Heterogeneous networks may also or instead include network devices and endpoints from multiple different vendors.

In the context of a network containing a mixture of such endpoints, network devices, and other computing devices, it may be difficult or impossible to bring certain devices into compliance with a network policy. For example, it may be impossible to install a security agent on a smart appliance to ensure safe, malware-free local execution of software. As another example, device identification information may be lost as communications pass through a network address translation device or through a combination of different network devices from different vendors, thus rendering secure management of network communications among devices within the network, and with devices or services outside of an enterprise network, more challenging. Disclosed herein are a variety of techniques for securing endpoint operation and network communications in a heterogeneous network for an enterprise.

FIG. 1 illustrates an environment for threat management. Specifically, FIG. 1 depicts a block diagram of a threat management system providing protection to an enterprise against a plurality of threats—a context in which the following techniques may usefully be deployed. In general, a policy management facility 112 may be used to manage the policies for some or all of the corporate computing assets in the enterprise, and a threat management facility 100 may be used distribute such policies and to monitor compliance therewith. The threat management facility 100 may provide multiple security and management services instead of or in addition to policy management.

The threat management facility 100 may provide an enterprise facility 102 such as an enterprise network with protection from computer-based malware, including viruses, spyware, adware, Trojans, intrusion, spam, policy abuse, uncontrolled access, and the like. The enterprise facility 102 may, for example, be a facility including computer and network resources for any corporate, commercial, educational, or governmental enterprise or the like. The enterprise facility 102 may include a computer network, which may be at a single physical facility or distributed amongst a plurality of facilities and in a plurality of geographical locations. The enterprise facility 102 may include an administration facility 134, a firewall 138A, an appliance 140A, a server 142A, network devices 148A-B, clients 144A-D, and the like. The aforementioned devices within the enterprise facility 102 may be protected by security agents 152 of the endpoint computer. It will be understood that any reference herein to client facilities may include the clients 144A-D shown in FIG. 1 and vice-versa.

The threat management facility 100 may provide a plurality of functions through components or platforms such as security management facility 122, a policy management facility 112, an update facility 120, a definitions facility 114, a network access rules facility 124, a remedial action facility 128, a detection facility 130, a testing facility 118, a threat research facility 132, and the like. In embodiments, the threat management facility 100 may provide threat management functions beyond the network boundaries of the enterprise facility 102 to include, e.g., clients 144D connected to network resources that are not directly associated with or controlled by the enterprise facility 102. Threats to client facilities may come from a plurality of sources, such as from network threats 104, physical proximity threats 110, secondary location threats 108, and the like. Clients 144A-D may be protected from threats even when the located beyond the enterprise facility 102, such as when a client 144E-F moves in and out of the enterprise facility 102, for example when interfacing with an unprotected server 142C through the data network 154, or when a client 144F is moving into an area posing secondary location threats 108 such as when interfacing with components 140B, 142B, 148C, 148D that are not protected.

The threat management facility 100 may operate as a stand-alone security solution, or the threat management facility 100 may be integrated into or cooperate with one or more third-party products such as commercial libraries of known vulnerabilities and exploits or commercial providers of virus definitions, remediations and so forth.

The security management facility 122 may be operable to scan clients 144A-D on machines operating within the enterprise facility 102, or clients 144E-F otherwise managed by the threat management facility 100, for malicious code, to remove or quarantine certain applications and files, to prevent certain actions, to perform remedial actions, and to perform other security measures. In embodiments, scanning the clients 144A-D and/or 144E-F may include scanning some or all of the files stored thereon at any suitable time(s). For example, this may include scanning on a periodic basis, scanning an application when the application is executed, scanning files as the files are transmitted to or from one of the client facilities 144A-F, or the like. The scanning of the applications and files may be performed to detect known malicious code or known unwanted applications. In general, new malicious code and unwanted applications are continually developed and distributed, and the known code database for the security management facility 122 may be updated on a periodic basis, on an on-demand basis, on an alert basis, or the like.

The security management facility 122 may provide email security to protect against spam, viruses, spyware and phishing, and the like, as well as management or control of email content. Email security and control may also or instead protect against inbound and outbound threats, protect email infrastructure, prevent data leakage, provide spam filtering, and the like. The security management facility 122 may also or instead provide web security, e.g., to help protect against exposure to viruses, spyware, malware, unwanted applications, and the like during web browsing activity, and to otherwise control or manage web browsing. Web security measures may include Internet use policies, reporting on suspect devices, security and content filtering, active monitoring of network traffic, URI filtering, and the like. The security management facility 122 may also or instead provide network access control, including control over network connections, e.g., to stop unauthorized, guest, or non-compliant systems from accessing networks through the enterprise facility 102, or to control network traffic into and out of the enterprise facility 102. This may also or instead include controlling access to virtual private networks (VPNs) that provide a communications network tunneled through another network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Behavioral protection, as distinguished from runtime protection, can advantageously identify malicious code at a gateway or file servers and delete the code before it can reach endpoint computers and the like.

The security management facility 122 may provide reputation filtering to target or identify sources of known malware. For instance, reputation filtering may use lists of URIs of known sources of malware or known suspicious IP addresses, or domains that, when detected, invoke an action by the threat management facility 100, such as dropping packets, terminating connections or taking other remedial action. By dropping the source before any interaction can occur, potential threat sources may be thwarted before any exchange of data can be made.

The policy management facility 112 may manage access rules and policies that are distributed throughout the enterprise facility 102 to manage and control use of network resources by client facilities 144A-F. The policies may be defined or organized by application type, application capabilities, organization hierarchy, computer facility type, user type, network location, time of day, connection type, and so forth. Policies may be maintained by the administration facility 134, through the threat management facility 100. For example, a policy may restrict IM activity to communications with customers by support personnel. In general, the policy management facility 112 may operate as a stand-alone application deployed within the enterprise facility 102 (e.g., as a service of the server facility 142 if the network)

or remotely as a cloud service, as an application on the client facilities 144A-F, or some combination of these.

The threat management facility 100 may provide configuration management services for managing the configuration of applications, operating systems, hardware, and the like on endpoints such as the client facilities 144A-F (in general, the terms endpoint, client, and client facility are used interchangeably herein unless a different meaning is explicitly provided or otherwise clear from the context). The threat management facility 100 may also provide for the removal of applications that potentially interfere with the operation of the threat management facility 100, such as competitor products that provide overlapping or conflicting threat management functions.

Threat management against a quickly evolving malware environment may require timely updates, and thus an update facility 120 may be provided by the threat management facility 100 to update malware definitions, remediation software, rules, definitions and so forth. In addition, the policy management facility 112 may require update management (e.g., as provided by the update facility 120 herein described). The update management for the security management facility 122 and policy management facility 112 may be provided directly by the threat management facility 100, such as by a hosted system or in conjunction with the administration facility 134. In embodiments, the threat management facility 100 may provide patch management, e.g., for operating systems, applications, system tools and the like.

The threat management facility 100 may provide controlled access to the enterprise facility 102. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the enterprise facility 102 or may be on another network such as the data network 154. In an embodiment, the network access rules facility 124 may verify access rights for client facilities from within the enterprise facility 102 or may verify access rights of computer facilities from external networks. When network access for a client facility is denied, the network access rules facility 124 may send a data file to the client facility containing related information. The data file may contain a number of commands, definitions, instructions, or the like to be parsed and acted upon through the remedial action facility 128, or the like.

The network access rules facility 124 may include databases such as a block list, a black list, an allowed list, a white list, an unacceptable network site database, an acceptable network site database, a network site reputation database, or the like of network access locations that may or may not be accessed by the client facility. The network access rules facility 124 may also or instead include rules, application logic or the like for controlling network access according to network policies and the like. The network access rule facility 124 may provide updated rules and policies to the enterprise facility 102.

The detection facility 130 may be used to monitor activity and stored files on computing facilities, such as on server facilities 142, desktop computers, laptop computers, other mobile computing devices, and the like. The detection facility 130 may monitor the enterprise facility 102 network or endpoint devices, such as by monitoring streaming data through the gateway, across the network, through routers and hubs, and the like.

When a threat or policy violation is detected, e.g., by the detection facility 130 or more generally, by the threat management facility 100, the threat management facility 100 may perform or initiate a remedial action from the remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, recording interactions for subsequent evaluation, or the like. Remedial action may also or instead include modifications to network access rules in order to terminate or restrict network activity by affected devices. Remedial action may also or instead include deployment of remediation Remedial action may also or instead include a scan of affected software and/or endpoints. More generally any action or combination of actions suitable for managing or containing threats or potential threats may be used by the remedial action facility 128.

The testing facility 118 may allow the administration facility 134 to coordinate the testing of the security configurations of client facilities in the enterprise facility 102. For example, the administration facility 134 may send test files to a set of client facilities to test the security posture. After the test file has been transmitted, a recording facility may record the actions taken by each of the client facilities in reaction to the test file. The recording facility may aggregate testing information from the client facilities and report the testing information to the administration facility 134. The administration facility 134 in turn evaluate a level of preparedness of the client facilities based on the reported information. Where appropriate, remedial action may be initiated for any vulnerable or compromised client facilities as determined by the administration facility 134.

The threat management facility 100 may provide threat protection to the enterprise facility 102 including networked components such as client facility, server facility 142, administration facility 134, firewall facility 138, gateway, hubs and routers 148, appliance facility 140 (which may be a stand-alone application or network device, or may be deployed within one or more of the firewalls, gateways, routers and so forth), desktop users, mobile users, and the like. A security agent located on each endpoint may also or instead provide threat protection to a user. The term endpoint, as used herein, may refer to a computer system that sources data, receives data, evaluates data, buffers data, or the like (such as a desktop computer, mobile device, server, or other computing device), a firewall as a data evaluation endpoint computer system, a laptop as a mobile endpoint computer, a personal digital assistant or tablet as a hand-held endpoint computer, a mobile phone as an endpoint computer, or the like. Thus, endpoints include the client facilities 144 and server facilities 142 described herein, as well as any other computing devices or the like coupled in a communicating relationship to the data network 154 and/or within the enterprise facility 102. The term endpoint may also or instead refer to a source or destination for data.

The enterprise facility 102 may include a plurality of servers 142, such as application servers, communications servers, file servers, database servers, proxy servers, mail servers, fax servers, game servers, web servers, and the like. A server facility 142 may include any machine or application that accepts client facility connections in order to service requests from client facilities 144. In one aspect, the server facility 142 may run on the same computer as a client facility 144 using it, or the server facility 142 and the client facility 144 may be running on different computers and communicating across the network. A server facility 142 may also be an appliance facility 140, where the appliance facility 140 provides specific services onto the network.

A client facility may be protected from threats from within the enterprise facility 102 using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed.

Another component that may be protected by a security agent 152 of the endpoint computer is a firewall facility 138 of the network. The firewall facility 138 may be a hardware or software device that may be configured to permit, deny, or proxy data through a computer network that has different levels of trust in its source of data. For instance, an internal network of the enterprise facility 102 may have a high level of trust, because the source of all data has been sourced from within the enterprise facility 102. An example of a source with a low level of trust is a data network 154 that includes a public network such as the Internet, and more particularly, unknown sources of data on the Internet. A perimeter network forms a zone with an intermediate trust level situated between the Internet and a trusted internal network. Since firewall facilities 138 may represent boundaries between threat levels (corresponding to boundaries between different networks), the security agent 152 associated with the firewall facility 138 may provide resources that control the flow of threats at this enterprise facility 102 network entry point. Firewall facilities 138, and associated security agents 152, may also be associated with a network node that is equipped for interfacing between networks that use different protocols. In embodiments, a security agent 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop security agent 152.

Client facilities within the enterprise facility 102 or outside the enterprise facility 102 may be connected to the enterprise facility 102 network by way of wired network devices 148A or wireless network facilities 148B, or any combination of these. Within areas exposed to secondary location threats 108, there may be no security agents 152 at network components such as firewalls 138B, server facilities 142B, clients 144G, hubs and routers 148C-D, and the like. As a result, the computer components at such locations may be open to threat attacks, and become potential sources of threats. In this instance, these computer components may now unknowingly spread a threat to other components connected to the network, and it may be useful to track transitions into and of these secondary locations by devices associated with the enterprise facility 102 but connected to other network resources outside the enterprise facility 102.

Having provided an overall context for threat detection, the description now turns to a brief discussion of an example of a computer system that may be used for any of the entities and facilities described above.

Figure 2:
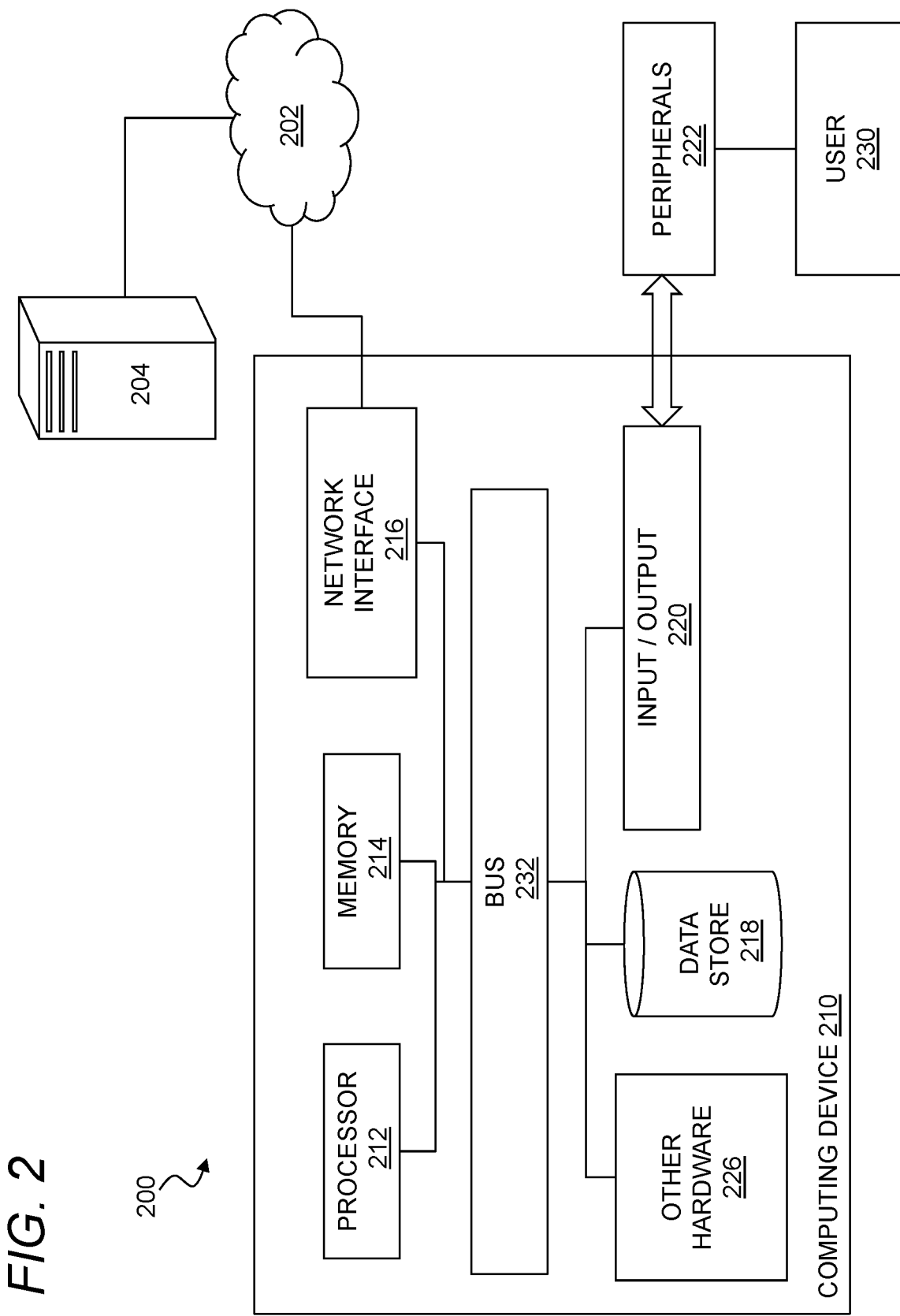
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include the network 105 described above, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output interfaces 220. The computing device 210 may further include or be in communication with peripherals 222 and other external input/output devices 224.

The processor 212 may be any as described herein, and may generally be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 210 and configuring the computing device 210 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 210 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output interface 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 210. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 210 may be used as a peripheral 222 as contemplated herein.

Other hardware 226 may be incorporated into the computing device 210 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 210 such as the processor 212, memory 214, network interface 216, other hardware 226, data store 218, and input/output interface. As shown in the figure, each of the components of the computing device 210 may be interconnected using a bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 210 may be deployed as a number of parallel processors synchronized to execute code together for improved performance, or the computing device 210 may be realized in a virtualized environment where software on a hypervisor or other virtualization management facility emulates components of the computing device 200 as appropriate to reproduce some or all of the functions of a hardware instantiation of the computing device 210.

Figure 3:
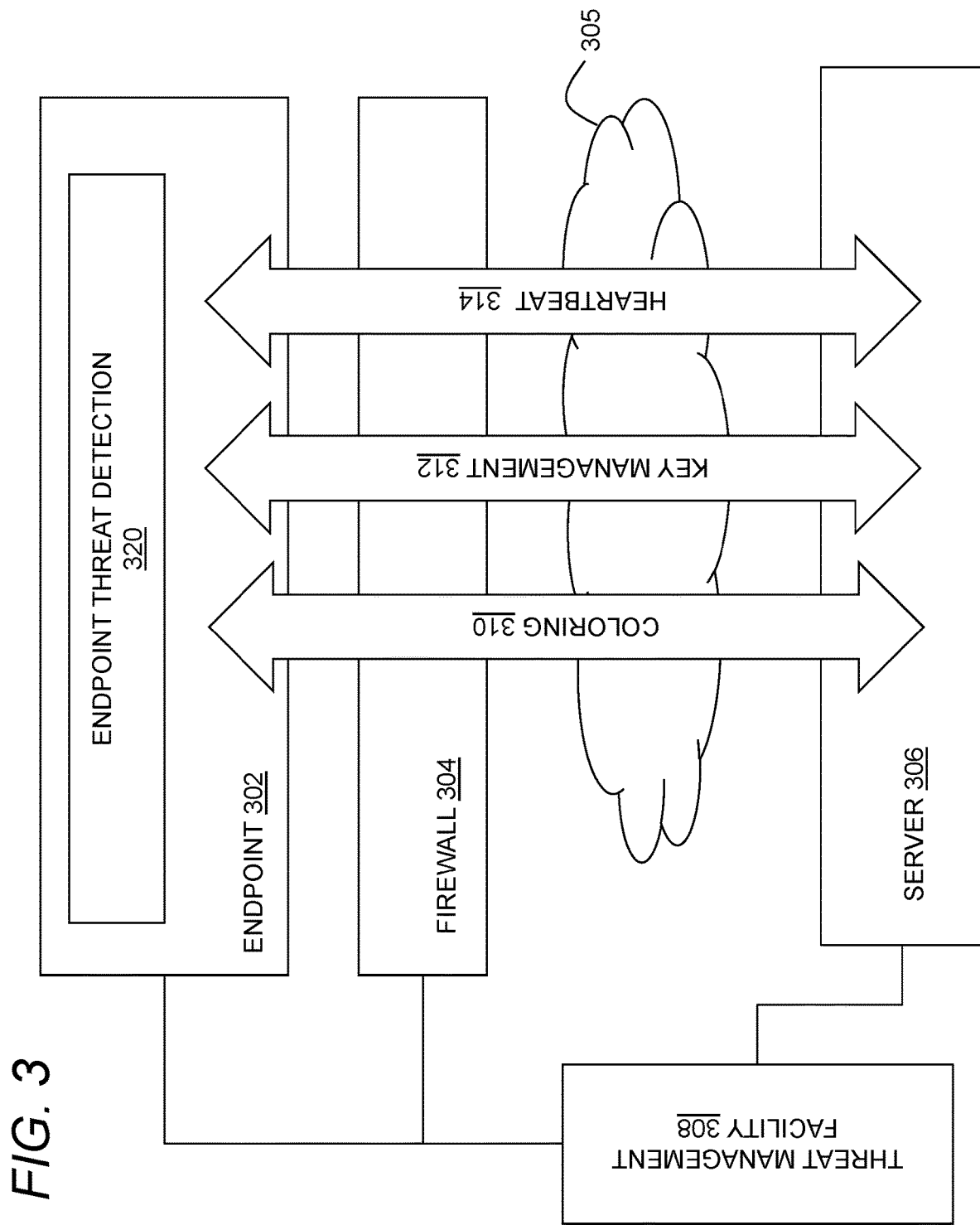
FIG. 3 illustrates a threat management system.

FIG. 3 illustrates an exemplary threat management system as contemplated herein. In general, the system may include an endpoint 302, a firewall 304, a server 306 and a threat management facility 308 coupled to one another directly or indirectly through a data network 305, for example, as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or color software objects for improved tracking and detection of potentially harmful activity. The coloring system 310 may, for example, label files, executables, processes, events, network communications, data, data sources and so forth with any suitable color. A variety of techniques may be used to select static and/or dynamic labels for any of these various software objects, and to manage the mechanics of applying and propagating coloring information as appropriate. For example, a process may inherit a color from an application that launches the process, or from a user that launches the application. Similarly, a file may inherit a color from a process when it is created or opened by a process, and/or a process may inherit a color from a file that the process has opened. A user may inherit a color from a process or from a file accessed by the user. More generally, any type of labeling, as well as rules for propagating, inheriting, changing, or otherwise manipulating such labels, may be used by the coloring system 310 as contemplated herein. A request or access of honeypot key material may be used by the coloring system 310 to indicate that a device, process, application, file, user, etc. has requested or accessed honeypot keys. The color may indicate that one or more of the device, process, application, file, or user is, for example, suspicious or compromised.

The key management system 312 may support management of keys for the endpoint 302 to selectively permit or prevent access to content on the endpoint 302, or content on a local or remote data store accessible, for example, by the endpoint 302, or by a server 306, on a file-specific basis, a process-specific basis, an application-specific basis, a user-specific basis, or any other suitable basis to prevent data leakage, and to support more fine-grained and immediate control over access to content on the endpoint 302 when a security compromise is detected. Thus, for example, if a particular process executing on the endpoint is compromised, or potentially compromised or otherwise under suspicion, keys to that process may be revoked to prevent, e.g., data leakage or other malicious activity.

In various embodiments, a process that attempts to access a file may directly or indirectly (e.g., through an operating system, file system, file system driver, etc.) request key material to access the file, file system, etc. The access to the key material may be governed according to access rules for one or more of the device, process, application, file, or user, which may include an evaluated security state of an applicable device, process, application, file, or user. The coloring system 310 may be used, in whole or in part, to determine a security state. A request to access key material may be detected by the key management system 312, and so the key management system 312 may be used to detect the request to access, or access of, honeypot keys.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 302 to the threat management facility 308) or bidirectionally (e.g., between the endpoint 302 and the server 306, or any other pair of system components) on any useful schedule. The heartbeat system 314 may usefully provide a secure communication channel between any of the endpoint 302, the firewall 304, the server 306, and the threat management facility 308. In implementations, information from the endpoint 302 may be communicated from the endpoint 302 to a firewall 304, and the information may be passed on by the firewall 304 to the server 306. The heartbeat system 314 may be used, for example, to communicate administrative, system management, system configuration, or other information in addition to health and security status information. For example, the heartbeat system 314 may be used to direct the endpoint 302 to undertake action for security purposes, such as to provide process information to the firewall 304, to stop a process running on the endpoint 302, or to delete keys used by the key management system 312. For example, the heartbeat system 314 may be used to notify an endpoint 302 that a request for honeypot keys has been made, and to direct the endpoint 302 to take remedial action. As a more specific example, the heartbeat system 314 may be used to notify a server 306 that a device, application, process, file, or user that has requested honeypot key material is compromised, and to limit access to the corresponding device, application, process, file, or user, as the case may be.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 4:
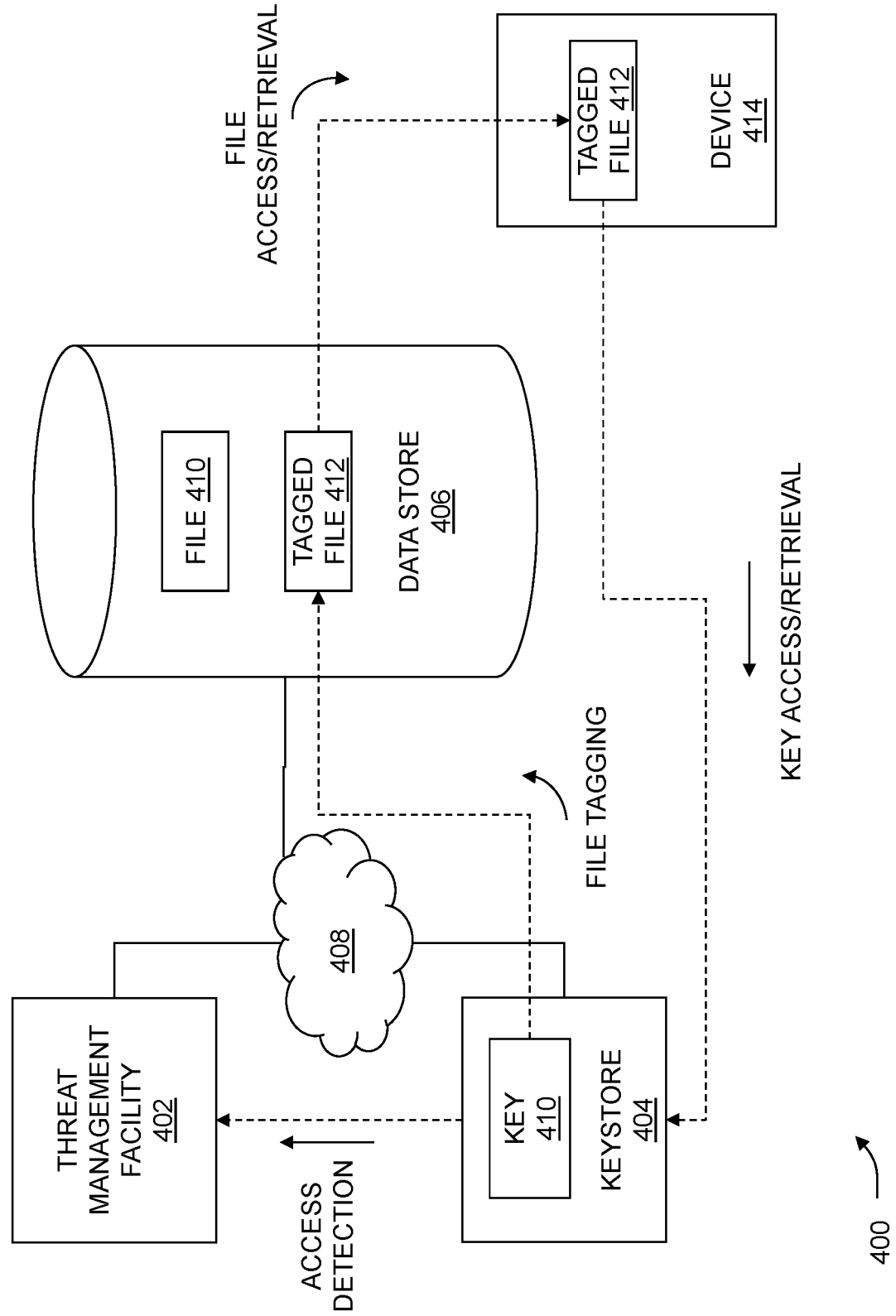
FIG. 4 illustrates a system for using honeypot keys.

FIG. 4 illustrates a system for using honeypot keys. In general, the system 400 may include a threat management facility 402, a keystore 404, and a data store 406 within or accessible to a network, referred to as an enterprise network 408. Unless otherwise indicated or made clear from the context, the enterprise network 408 may be any of the enterprise networks described herein, or any suitable network or combinations of networks. The description of an enterprise network in this context is not intended to be limiting to a particular type of network or implementation. For example, some or all elements of an enterprise network in this context may be implemented on one or more cloud resources, or as part of cloud infrastructure, or within a network directed to a home or for personal use.

In operation, the threat management facility 402, which may be any of the threat management facilities described herein, may provide a file for use as a honeypot file. This may be, for example, a file provided by an administrator, and may include attributes selected to be attractive to a network intruder or other malicious user or code that might enter the enterprise network 408 to misappropriate data. In one aspect, the file may be a new file created with data such as faked or actual passwords, credentials, financial data, technical data or the like intended to draw attention and appear potentially valuable. In another aspect, the threat management facility 402 may employ a crawler or the like to traverse accessible locations on the enterprise network 408 to find pre-existing files with suitable characteristics for use as a honeypot file. For example, a crawler on the threat management facility may locate a file 410 such as a spreadsheet of sales data. The file may be already published outside the enterprise network 408, or the file may be modified to protect the actual data. For example, for a spreadsheet, the threat management facility 402 may replace numbers in the file with other data (e.g., modified data), so that that file has the same format as the actual file, but has different, incorrect data. In various embodiments, techniques may be used to create a honeypot file that appears to have the same size and format as a legitimate file that appears to have value. For example, replacement numbers may be selected to replace numbers and dictionary words may be used to replace words of similar size in the file. When such a file is encrypted, it could have the same appearance as similar actual files, which may be sufficient. For other applications, it may be desirable to use a file that includes data that appears to be realistic to an outsider or even to an insider familiar with the type of file.

The threat management facility 402 may then request or generate key material 411, such a symmetric key or an asymmetric key pair, to cryptographically secure the file 410, e.g., using any of the techniques described herein, and return a corresponding tagged file 412 to the data store 406 where the file 410 was located. The threat management facility 402 may also or instead store the tagged file 412 in any other data store or other location within the enterprise network 408 suitable for placement of honeypot files. It will be understood that, while a cryptographically secured file is described, this may more generally include any computing object including without limitation, a process, data in a database, registry entries, communications within a communication infrastructure such as electronic mails or text messages, and so forth.

The keystore 404 may be a central keystore or other repository for storing and controlling access to keys for encrypting, decrypting, signing, authenticating, or otherwise cryptographically handling files and other data. In one aspect, the keystore 404 may be an enterprise network resource that provides keys and other key management services within the enterprise network 408. The keystore 404 may also or instead include a remote key management system such as a cloud-based key management system that is accessible to entities within the enterprise network through a public network such as the Internet. The keystore 404 may also or instead include a trust management system or other trust authority or the like controlled by a trusted third party and provisioned to provide key management services to entities within the enterprise network 408.

The data store 406 may include any location or combination of locations suitable for storing data such as files within the enterprise network 408. For example, the data store 406 may include a file server, a shared directory, a web server, a database, a mail server, a message server or the like that is accessible to other network users, e.g., on an open, public basis, or with credentials, or on any other conditional basis. The data store 406 may also or instead include an endpoint on the enterprise network 408. Thus, in one aspect, tagged files 412 may usefully be distributed to endpoints throughout the enterprise network 408 to provide a wide net for detecting illicit access and retrieval of files.

After the tagged file 412 has been created and placed on the data store 406, the tagged file 412 can be used to detect unauthorized file access by a device 414. In general, the device 414 that accesses the tagged file 412 may be an endpoint on the enterprise network 408, an external device, or any other device, program, or the like that might be controlled by a malicious actor and used to obtain unauthorized access to network assets, files and the like. For example, where a malicious actor installs a remote-control component on an endpoint within the enterprise network 408, this may be used to control the internal endpoint from a remote command and control location to access the data store 406. In another aspect, a malicious actor may illicitly obtain credentials for remote, external access to a data store 406 such as a shared directory, file server or the like, and may use these credentials to retrieve data such as the tagged file 412. It will also be appreciated that, while a device as contemplated herein may be a physical device accessing a file, the device 414 may also or instead include a virtual machine or virtual software component that is not associated with a specific physical device.

When a device 414 such as any of the devices described herein retrieves or otherwise accesses the tagged file 412 and attempts to open or authenticate the tagged file 412 using the key material 411 from the keystore 404, the threat management facility 402 may detect access to the tagged file 412 (by detecting a request or access to the key material 411) and initiate any suitable remedial action. A method for using honeypot keys in this system 400 is now described in greater detail.

Figure 5:
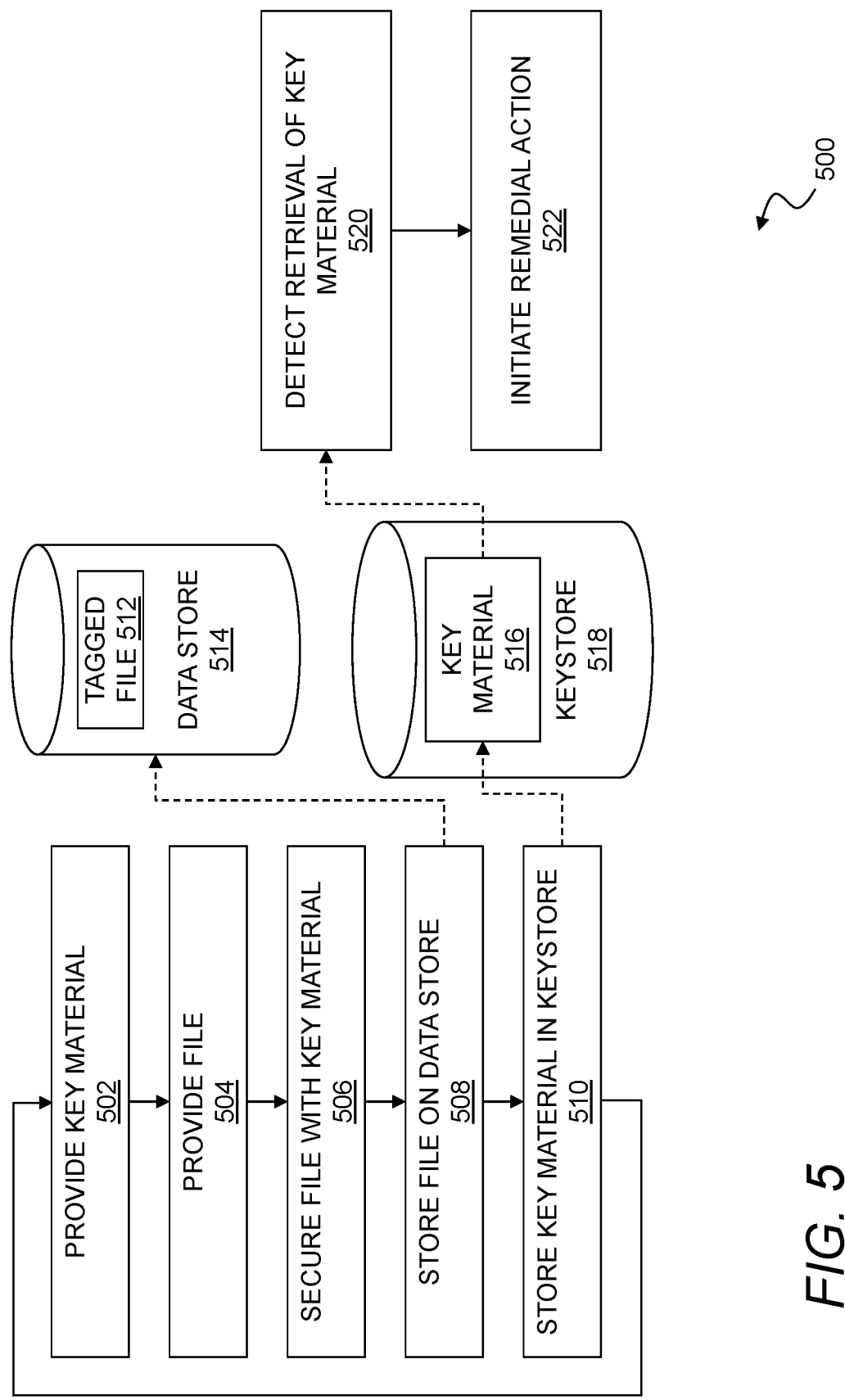
FIG. 5 illustrates a flow chart of a method for using honeypot keys.

FIG. 5 illustrates a flow chart of a method for using honeypot keys. In general, honeypot keys may be created that facilitate detection of file access regardless of whether and where the file access is initiated. As a significant advantage, this approach alleviates the need to detect an initial, unauthorized file access, e.g., at the moment that the file is located or retrieved by a malicious actor, because subsequent actions to open or otherwise manipulate the cryptographically secured honeypot files will result in readily-detected access to a central keystore for the enterprise network. In effect, an unauthorized user will advertise possession of the honeypot file by requesting key material to use the file. This method 500 may usefully be employed in combination with other intrusion detection techniques that seek to detect the moment or location of intrusion, or this method 500 may be used alone or independently from other intrusion detection techniques to identify and address actual instances of unauthorized file retrieval and/or access.

As shown in step 502, the method 500 may begin with providing key material for cryptographic handling of a file. This may, for example, include creating key material for cryptographic handling of a file at a key management system for an enterprise network, which may be a remote, third-party key management system or an internal key management system operated, e.g., by a threat management facility or other entity in the enterprise network infrastructure. In one aspect, the key material may include a key pair having a private encryption key and a public decryption key. In another aspect, the key material may include a key pair having a private signature key and a public authentication key. More generally, the key material may include a symmetric key, an asymmetric key pair, or any other key, combination of keys, or other key material or the like suitable for performing cryptographic operations on files such as encryption, decryption, signature, authentication, verification of origin, and so forth.

As shown in step 504, the method 500 may include providing a honeypot file. The honeypot file may be a document created specifically for use as a honeypot file, e.g., containing fictitious corporate data, or the honeypot file may be an archived file such as a file retrieved from a data store in the enterprise network and containing non-confidential information. In one aspect, the honeypot file may be modified to make the file more attractive to potential intruders, bots or the like. Thus for example, providing the honeypot file may include modifying an access control list for the file to make the file appear more important, such as by modifying an access control list for the honeypot file to limit the access control list to a small number of users, or to make the file appear more relevant or popular, such as by modifying an access control list for the honeypot file to include an open access user in the access control list. The honeypot file may also be modified, e.g., to remove confidential or sensitive information, personal identifying information, and so forth. According to the foregoing, in one aspect, providing a honeypot file may include providing a honeypot file containing non-confidential information for the enterprise network and having an access control list configured to attract unauthorized, malicious users of the enterprise network. More generally, any file may be usefully employed as a honeypot file as contemplated herein.

While honeypot files may be manually created and curated, providing the honeypot file may also or instead include automatically creating one or more honeypot files based on pre-existing files on an enterprise network. For example, providing the honeypot file may include providing a crawler that traverses the enterprise network to locate documents having one or more properties suitable for use as the honeypot file. Providing the honeypot file may also or instead include selecting a non-confidential file available in a data store within the enterprise network, which can be cryptographically tagged as contemplated herein and then stored as an older version of the non-confidential file on the data store, or in some other location, as a tagged file for intrusion and/or data leakage detection. As a significant advantage, the use of versioning as described above will product honeypot files that appear older or out of date so that legitimate network users will specifically tend not to retrieve or open such files, while an illegitimate network user may specifically focus on such files as targets that are likely not being monitored carefully.

As shown in step 506, the method 500 may include cryptographically securing the honeypot file with the key material to provide a tagged file. This may, for example, include encrypting the honeypot file with a private encryption key to provide a tagged file, or otherwise using the key material to encrypt the honeypot file. In another aspect, cryptographically securing the honeypot file may include using the key material to digitally sign the honeypot file.

As shown in step 508, the method 500 may include storing the tagged file on a data store in an enterprise network. The data store may, for example, include network storage for the enterprise network such as a shared directory or network attached storage. The data store may also or instead include an endpoint, or a directory on an endpoint in the enterprise network. In another aspect, the data store may include a file server, web server, electronic mail server, or other data repository or communications hub that might be accessed by an intruder searching for valuable information or documents. As a significant advantage, deploying honeypot files in this manner permits such files to be distributed among and intermingled with other files across an enterprise network. Thus, rather than created a special-purpose honeypot or other directory, the honeypot files may be placed in any desired locations throughout the enterprise network and instrumented for subsequent detection of retrieval and use. At the same time, by linking particular keys to particular endpoints and network locations within the enterprise network, it may be possible to detect the specific location that has been compromised concurrently with detecting the unauthorized user who is accessing the tagged file.

As shown in step 510, the method 500 may include storing at least a portion of the key material in a central keystore for the enterprise network, such as by storing a public decryption key in a central keystore for the enterprise network or by storing a public authentication key in the central keystore. As noted above, the keystore may be any keystore suitable for use in an enterprise network, and may, for example, include a local keystore, a remote cloud resource for the enterprise network, a third party trusted resource, or some combination of these. The central keystore may be maintained by a key management system, which may be hosted at the keystore, on a threat management facility for the enterprise network, or at any other suitable location within, or accessible from, the enterprise network.

After completing step 510, the enterprise network generally includes a tagged file 512 stored on a data store 514 (where it can be located by an unauthorized user), along with corresponding key material 516 stored in a central keystore 518 for the enterprise network. With the tagged file 512 and the key material 516 deployed in this manner, the data store 514 has been instrumented (via the central keystore 518) to detect unauthorized access, particularly where the tagged file 512 is retrieved and opened, authenticated, or otherwise cryptographically processed with the key material 516. The method 500 may then return to step 502 where additional files may be prepared, cryptographically secured, and stored. At the same time, or thereafter, the method 500 may proceed to step 520 where monitoring for unauthorized access may begin.

As shown in step 520, the method 500 may include detecting a retrieval of the key material, such as a portion of the key material used to cryptographically process the tagged file, from the central keystore. In general, the retrieval of the key material is associated with access to the tagged file by a device such as any of the devices described herein. Where, for example, the honeypot file was encrypted with a private key, detecting the retrieval may include detecting a request for the public decryption key or the retrieval of the public decryption key from the central keystore. Detecting the retrieval may also or instead include detecting the request for or the communication of the key material at a firewall, access point or other network device, for example, by monitoring network traffic for a request or communication of key material. Detecting the retrieval may also or instead include detecting the request for or the communication of the key material on an endpoint by monitoring network traffic on the endpoint for a request or communication of key material. Detecting the retrieval may also or instead include detecting an opening of a tagged file, e.g., where opening the file requires access to cryptographic functions using the key material, and/or detecting an authentication of the tagged file, e.g., where all or one or more portions of the file was digitally encrypted or signed with corresponding key material. More generally, a variety of techniques may be used to monitor access to and use of cryptographically secured files as contemplated herein. For example, retrieval of the key material may be requested from a file system extension on an endpoint that controls access to encrypted content, or the retrieval of the key material may be requested from a decryption tool on an endpoint, such as a security agent, custom cryptographic process, browser cryptographic tools, and so forth, which may be used to detect the request or access.

As shown in step 522, the method 500 may include initiating a remedial action to a retrieval of the key material (or a portion of the key material). The remedial action may include any remedial action consistent with responding to a device that is attempting to open a honeypot file, or consisting with responding to a compromise of a location on the enterprise network where the honeypot file was stored, as well as combinations of these. For example, initiating a remedial action may include monitoring subsequent network activity within the enterprise network by the device that used/accessed the tagged file. In one aspect, initiating the remedial action may include identifying the device as a malicious intruder. This may also include blacklisting the malicious intruder from the enterprise network, redirecting the malicious intruder to a honeypot, or monitoring activities of the malicious intruder, e.g., to continue surveillance and obtain additional information about malicious activities by the device. The remedial action may also or instead include triggering an alert, which may be directed to a threat management facility or other automated network security infrastructure, and or to a human security administrator, e.g., through an electronic mail, text message, phone call, or other communications channel or combination of channels.

For example, a key store, firewall, access point, or endpoint may treat the request or access of key material as a reportable event, that may be communicated to a threat management facility, firewall, server, endpoint, etc., for example, using the heartbeat system. As an example, the threat management system may notify an administrator, and, further or instead, take measures to isolate or restrict access to resources by a device, application, process, file, or user involved in accessing the key material. A reportable event may be communicated to the endpoint that requested the public decryption key. A reportable event may be communicated to the coloring system, which colors a device, application, process, file, or user to indicate a potential or actual compromise.

As noted above, honeypot files may usefully be distributed throughout an enterprise network. For example, one or more honeypot files may usefully be stored on each user endpoint within the enterprise network. Where the data store is on such an endpoint of the enterprise network and a compromise of that endpoint is detected, then the remedial action may include remediating that endpoint. Remediating the endpoint in this context may, for example, include quarantining the endpoint, pulling one or more keys for access to secure content on the endpoint from the endpoint, scanning the endpoint for advanced persistent threats or other malware, and so forth.

According to the foregoing, there is also disclosed herein a system for detecting intrusion in an enterprise network. In general, the system may include a data store in an enterprise network, a central keystore for the enterprise network, and a threat management facility for the enterprise network, all as described herein. The threat management facility may be configured, e.g., by computer executable code embodied on one or more computing devices hosting the threat management facility, to instrument and monitor files as described above. For example, the threat management facility may be configured to obtain key material for cryptographic handling of a file from the central keystore, to provide a honeypot file, to cryptographically secure the honeypot file with the key material to provide a tagged file, to store the tagged file on the data store, to detect a retrieval of at least a portion of the key material from the central keystore, the retrieval associated with access to the tagged file by a device, and to initiate a remedial action to the retrieval of the portion of the key material.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer-readable medium that, when executing on one or more computing devices, performs the steps of:
   creating key material for cryptographic handling of a file at a key management system for an enterprise network, the key material including a key pair having a private encryption key and a public decryption key;
   providing a honeypot file containing non-confidential information for the enterprise network and an access control list for the honeypot file modified to attract unauthorized, malicious users of the enterprise network by including an open access user in the access control list;
   cryptographically securing the honeypot file by encrypting the honeypot file with the private encryption key to provide a tagged file;

storing the tagged file on a data store in the enterprise network;

storing the public decryption key in a central keystore for the enterprise network;

detecting a retrieval of the public decryption key from the central keystore, the retrieval associated with an authentication of the tagged file by a device; and initiating a remedial action responsive to detecting the retrieval associated with the authentication of the tagged file by the device, the remedial action including monitoring subsequent network activity within the enterprise network by the device.

2. A method comprising:

providing key material for cryptographic handling of a file at a key management system for an enterprise network, the key material including a key pair having a private encryption key and a public decryption key;

providing a honeypot file containing non-confidential information for the enterprise network and an access control list for the honeypot file modified to attract unauthorized, malicious users of the enterprise network by including an open access user in the access control list;

cryptographically securing the honeypot file with the key material to provide a tagged file;

storing the tagged file on a data store in an enterprise network;

storing at least a portion of the key material in a central keystore for the enterprise network;

detecting a retrieval of the portion of the key material from the central keystore, the retrieval associated with an authentication of the tagged file by a device; and initiating a remedial action responsive to the retrieval associated with the authentication of the tagged file.

3. The method of claim 2 wherein the key material includes an asymmetric key pair.

4. The method of claim 2 wherein cryptographically securing the honeypot file includes using the key material to encrypt the honeypot file.

5. The method of claim 2 wherein cryptographically securing the honeypot file includes using the key material to digitally sign the honeypot file.

6. The method of claim 2 wherein the data store includes at least one of network storage for the enterprise network and a directory on an endpoint in the enterprise network.

7. The method of claim 2 wherein the central keystore includes at least one of a remote cloud resource for the enterprise network, and a third party trusted resource.

8. The method of claim 2 wherein detecting the retrieval of the key material includes at least one of detecting an opening of the tagged file and detecting the retrieval of the key material includes detecting an authentication of the tagged file.

9. The method of claim 2 wherein the retrieval of the key material is requested from a file system extension on an endpoint that controls access to encrypted content.

10. The method of claim 2 wherein the retrieval of the key material is requested from a decryption tool on an endpoint.

11. The method of claim 2 wherein initiating the remedial action includes identifying the device as a malicious intruder.

12. The method of claim 11 wherein the remedial action includes at least one of blacklisting the malicious intruder from the enterprise network, redirecting the malicious intruder to a honeypot, and monitoring activities of the malicious intruder.

13. The method of claim 2 wherein the remedial action includes triggering an alert.

14. The method of claim 2 wherein the data store is on an endpoint of the enterprise network, and wherein the remedial action includes remediating the endpoint.

15. The method of claim 14 wherein remediating the endpoint includes at least one of quarantining the endpoint and pulling one or more keys for access to secure content on the endpoint from the endpoint.

16. The method of claim 2 wherein providing the honeypot file includes selecting a non-confidential file available on the data store and storing the tagged file on the data store as an older version of the honeypot file.

17. The method of claim 2 wherein providing the honeypot file includes providing a crawler that traverses the enterprise network to locate documents having one or more properties suitable for use as the honeypot file.

18. The method of claim 2 further comprising modifying an access control list for the honeypot file to attract unauthorized, malicious users of the enterprise network by limiting the access control list to a small number of users.

19. A system comprising:

a data store in an enterprise network;

a central keystore for the enterprise network; and a threat management facility executing on a hardware processor and configured to obtain key material including a key pair having a private encryption key and a public decryption key for cryptographic handling of a file from the central keystore, to provide a honeypot file containing non-confidential information for the enterprise network and an access control list for the honeypot file modified to attract unauthorized, malicious users of the enterprise network by including an open access user in the access control list, to cryptographically secure the honeypot file with the key material to provide a tagged file, to store the tagged file on the data store, to detect a retrieval of at least a portion of the key material from the central keystore, the retrieval associated with a decryption of the tagged file by a device, and to initiate a remedial action responsive to the decryption using the portion of the key material.

* * * * *